(12) United States Patent
Kundu et al.

(10) Patent No.: US 9,063,815 B2
(45) Date of Patent: Jun. 23, 2015

(54) PROVISIONING A VIRTUAL MACHINE FROM ONE OR MORE VM IMAGES

(71) Applicant: International Business Machines Corporation, Armonk, NY (US)

(72) Inventors: Ashish Kundu, Elmsford, NY (US); Ajay Mohindra, Yorktown Heights, NY (US); Zhe Zhang, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 13/621,596

(22) Filed: Sep. 17, 2012

(65) Prior Publication Data

US 2014/0082613 A1 Mar. 20, 2014

(51) Int. Cl.
*G06F 9/455* (2006.01)
*G06F 9/445* (2006.01)

(52) U.S. Cl.
CPC .............. *G06F 8/63* (2013.01); *G06F 9/45533* (2013.01)

(58) Field of Classification Search
None
See application file for complete search history.

(56) References Cited

U.S. PATENT DOCUMENTS

| | | | |
|---|---|---|---|
| 7,996,414 B2 | 8/2011 | Alpern et al. | |
| 8,301,686 B1 * | 10/2012 | Appajodu et al. | 709/201 |
| 8,578,370 B2 * | 11/2013 | Dai et al. | 717/174 |
| 8,601,583 B1 * | 12/2013 | Chandrasekhar et al. | 726/24 |
| 8,671,406 B1 * | 3/2014 | Gopal et al. | 718/1 |
| 2004/0103412 A1 * | 5/2004 | Rao et al. | 717/171 |
| 2006/0155674 A1 * | 7/2006 | Traut et al. | 707/2 |
| 2006/0277542 A1 * | 12/2006 | Wipfel | 717/174 |
| 2008/0163171 A1 * | 7/2008 | Chess et al. | 717/120 |
| 2008/0256534 A1 * | 10/2008 | Chess et al. | 718/1 |
| 2008/0271017 A1 * | 10/2008 | Herington | 718/1 |
| 2009/0222474 A1 * | 9/2009 | Alpern et al. | 707/102 |
| 2009/0282404 A1 * | 11/2009 | Khandekar et al. | 718/1 |
| 2009/0328030 A1 * | 12/2009 | Fries | 717/174 |
| 2010/0169881 A1 * | 7/2010 | Silvera et al. | 718/1 |
| 2011/0004676 A1 * | 1/2011 | Kawato | 709/221 |
| 2011/0078681 A1 * | 3/2011 | Li et al. | 718/1 |
| 2011/0219372 A1 * | 9/2011 | Agrawal et al. | 718/1 |
| 2012/0089666 A1 * | 4/2012 | Goswami et al. | 709/203 |
| 2012/0159232 A1 * | 6/2012 | Shimada et al. | 714/3 |
| 2012/0167087 A1 * | 6/2012 | Lee et al. | 718/1 |
| 2012/0233608 A1 * | 9/2012 | Toeroe | 718/1 |
| 2012/0257820 A1 * | 10/2012 | Sanghvi et al. | 382/159 |
| 2012/0304169 A1 * | 11/2012 | Anderson et al. | 718/1 |

(Continued)

OTHER PUBLICATIONS

Deng et al., "Introducing Semantics to Cloud Services Catalogs", Proceedings of the 2011 IEEE International Conference on Services Computing (SCC '11), Jul. 2011, pp. 24-31.

(Continued)

*Primary Examiner* — Emerson Puente
*Assistant Examiner* — Hiren Patel
(74) *Attorney, Agent, or Firm* — Yee & Associates, P.C.; Louis J. Percello (57) ABSTRACT

An embodiment of the invention directed to a method for provisioning a specified virtual machine from one or more selected images, sent over the network, includes the step of decomposing each of the selected VM images to provide a group of components, each component having specified information associated with it. The method further includes using a predetermined selection criterion to select components from the group for assembly into a specified VM image, and using the selected components of the specified VM image to provision the specified virtual machine at one or more locations.

13 Claims, 7 Drawing Sheets

(56) References Cited

U.S. PATENT DOCUMENTS

| | | | |
|---|---|---|---|
| 2012/0324446 A1* | 12/2012 | Fries et al. | 718/1 |
| 2013/0007732 A1* | 1/2013 | Fries et al. | 718/1 |
| 2013/0061223 A1* | 3/2013 | Avina et al. | 718/1 |
| 2013/0227089 A1* | 8/2013 | McLeod et al. | 709/220 |
| 2014/0019968 A1* | 1/2014 | Deng et al. | 718/1 |
| 2014/0082615 A1 | 3/2014 | Kundu et al. | |
| 2014/0095816 A1* | 4/2014 | Hsu et al. | 711/162 |
| 2014/0096135 A1* | 4/2014 | Kundu et al. | 718/1 |

OTHER PUBLICATIONS

Ammons et al., "Virtual machine images as structured data: the Mirage image library", Proceedings of the 3rd USENIX Conference on Hot Topics in Cloud Computing (HotCloud '11), Jun. 2011, 6 pages.

Peng et al. "VDN: Virtual Machine Image Distribution Network for Cloud Data Centers", Proceedings of the 2012 IEEE International Conference on Computer Communications (INFOCOM '12), Mar. 2012, 9 pages.

Kochut et al. "Evaluation of Redundancy Driven Provisioning for Hypervisors with Locally Attached Storage", Proceedings of the 2011 IEEE 19th Annual International Symposium on Modelling, Analysis, and Simulation of Computer and Telecommunication Systems (MASCOTS '11), Jul. 2011, pp. 441-443.

Wei et al. "Managing Security of Virtual Machine Images in a Cloud Environment", Proceedings of the 2009 ACM Workshop on Cloud Computing Security (CCSW '09), Nov. 2009, pp. 91-96.

Office Action dated Dec. 4, 2014, regarding U.S. Appl. No. 13/653,660, 23 pages.

* cited by examiner

PROVISIONING A VIRTUAL MACHINE FROM ONE OR MORE VM IMAGES

BACKGROUND

1. Field

The invention disclosed and claimed herein generally pertains to use of a virtual machine (VM) image to provision a specified virtual machine. More particularly, the invention pertains to assembling or constructing the VM image from components or slices obtained from one or more other VM images.

2. Description of the Related Art

As is known by those of skill in the art, a virtual machine (VM) is a software implementation of a computer or like machine that executes programs in the manner of a physical machine. A virtual machine image is a group of software and data components that are used to provision a virtual machine, in order to provide a VM instance. VM images are of increasing interest in connection with cloud computing, wherein computer related resources are delivered over a network, such as the Internet, from a cloud computing resource supplier to a user.

Notwithstanding the benefits of making VM images available to users by cloud computing or other means, in order to achieve coherence and economies of scale, the current use of VM images has significant disadvantages. For example, a given VM image could include a particular operating system, a particular database, particular database tables that required the particular database, and a particular Web service. A user who needed access to the particular database and database tables might decide to use the given VM image to obtain such access. However, the user would have to pay a charge for accessing the particular operating system and web service, as well as for the particular database and database tables. This could be a very undesirable burden for the user, if the user already had other access to the particular operating system, and did not need the particular web service.

A further drawback in the use of VM images can be the slowness with which they may become available. As an illustration of this, the user could be receiving the given VM image described above, wherein the user could start doing useful work as soon as the particular operating system and database were instantiated at his location. Such instantiation could require only ten minutes. However, in current arrangements, these two components would not become available for use until the entire given VM image was instantiated in its entirety at the user's location. Thus, this instantiation would include the particular database tables and particular web service, which the user did not need immediately to begin his work. These items could add five or 10 minutes to the total instantiation time, by way of example. These added five or 10 minutes that the user would have to wait to begin his work could be quite burdensome, such as if the user had to instantiate the VM image frequently, or wanted to include it in a product being marketed to others.

Yet another disadvantage of currently used VM images pertains to trust or security. For the above given VM image, it could happen that the particular operating system and database were known by the user to be totally secure, but the web service was not known to be secure. Accordingly, if the user wanted to use the VM image in a product he was marketing, he could not guarantee its security.

SUMMARY

In an embodiment of the invention, one or more VM images can each be specified as a graph, wherein nodes of the graph comprise software components, libraries, directories and/or files, and edges may be containment, dependency and/or reference. Flexible VM data selection can then be based on subgraphs, wherein users are allowed to input their specific requirements. Thus, users can determine provisioning orders among component nodes, and can select some components such as those from trusted sources, while rejecting other untrusted components. Components can be streamed to facilitate pipelined processing, and subgraphs, which may be from different VM images, can be composed into a new VM image.

An embodiment directed to a method for provisioning a specified virtual machine from one or more selected VM images, sent over a network, includes the step of decomposing each of the selected VM images to provide a group of components, each component having specified information associated with it. The method further includes using a predetermined selection criterion to select components of the group for assembly into a specified VM image, and using the selected components of the specified VM image to provision the specified virtual machine at one or more locations.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
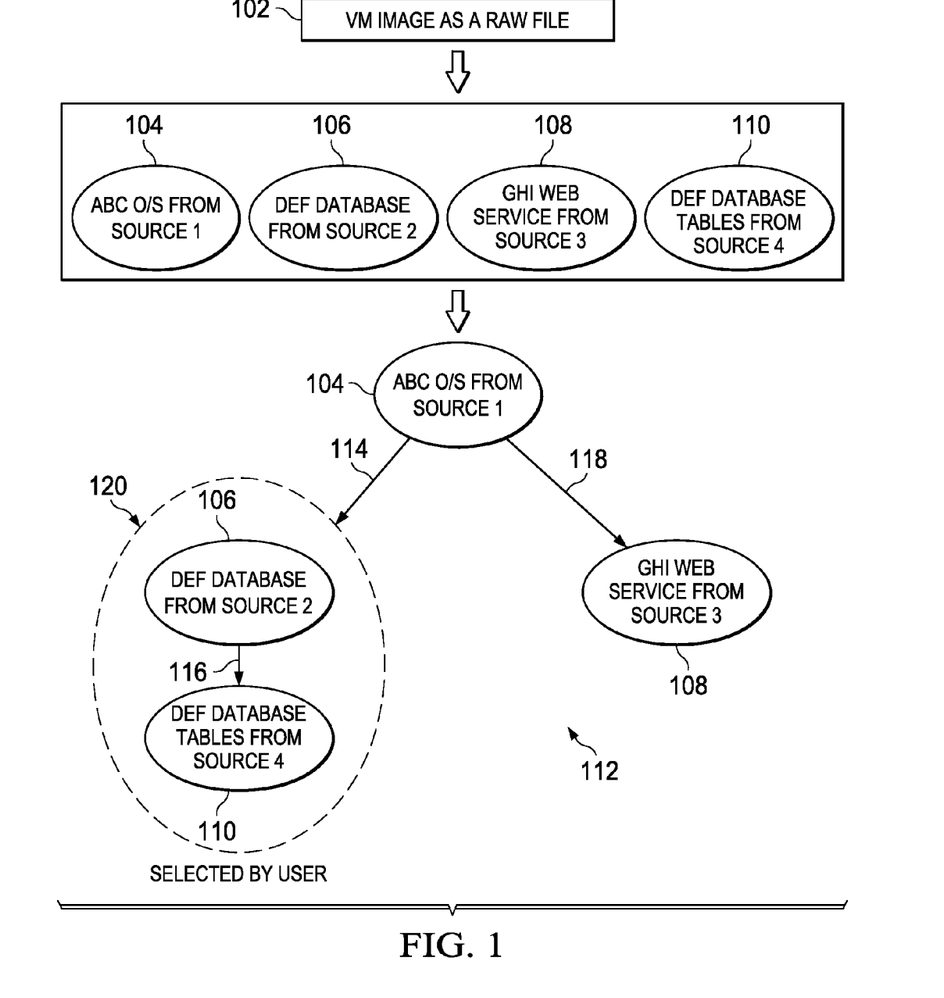
FIG. 1 is a schematic diagram illustrating a virtual machine image with which an embodiment of the invention may be used.

Referring to FIG. 1, there is shown an exemplary VM image 102 comprising a raw file, which is available to cloud users from a cloud computing source. By way of example and not limitation, VM image 102 includes components that comprise an operating system 104, a database 106, and web service 108 for accessing the Internet, and database tables 110 created from the database 106. As a generic representation, the operating system 104 comprises an ABC operating system (O/S) from a source 1; database 106 comprises a DEF database from a source 2; the web service 108 comprises a GHI web service from a source 3; and the DEF database tables 110 are from a source 4. Moreover, database 106 and web service 108 must both be deployed on operating system 104, and are thus dependent on that operating system. Also, the DEF database tables 110 cannot be generated unless the DEF database 106 has first been made available.

Referring further to FIG. 1, a cloud source user, by way of example, wants to create a new VM image to provision one or more virtual machines. The user wants DEF database 106, GHI web service 108, and DEF database tables 110 for the new VM image, and is aware that each of these components is included in VM image 102. The user is also aware of the component dependencies described above, and trusts database 106 and database tables 110 to be secure components. However, the user does not trust the GHI web service 108 to be secure.

In view of the above conditions, a sequence of steps or actions are taken, in accordance with an embodiment of the invention. As a first step, it is recognized that the user already has an ABC operating system, which is the same as operating system 104. VM image 102 is therefore decomposed into its respective components, and database 106 and database tables 110 are selected for copying into the new VM image, after the user's copy of operating system 104 has been copied thereinto. To complete the new VM image, the user obtains a copy of web service 108 from an alternative source, which the user knows to be a trusted source.

It will be appreciated that by not using operating system 104 of the VM image 102, a per hour licensing fee for the components of VM image 102 that are used could be reduced from 50 cents to 35 cents, by way of example, for a savings of 15 cents per hour. This could provide a very substantial savings, if the new VM image was to be run for long periods of time. Also, the embodiment of FIG. 1 overcomes a significant security issue, by enabling a trusted web service to be used for the new VM image, rather than the untrusted web service 108 of VM image 102.

FIG. 1 shows further that the decomposition of VM image 102, as described above, renders the respective components of VM image 102 into a graph 112. The components 104-110 comprise respective nodes of the graph. Edges 114-118 of the graph represent the respective dependencies that certain components have on other components, as described above. The components 106 and 110, selected by a user for the new image to be created, collectively form a subgraph or slice 120, of the graph 112.

In a raw file such as VM image 102, the applications and other components included in the VM image may not be known initially. Accordingly, an application discovery and dependency analysis tool, which captures the signatures of components, can be used to determine the respective components in the raw file VM image.

Figure 2:
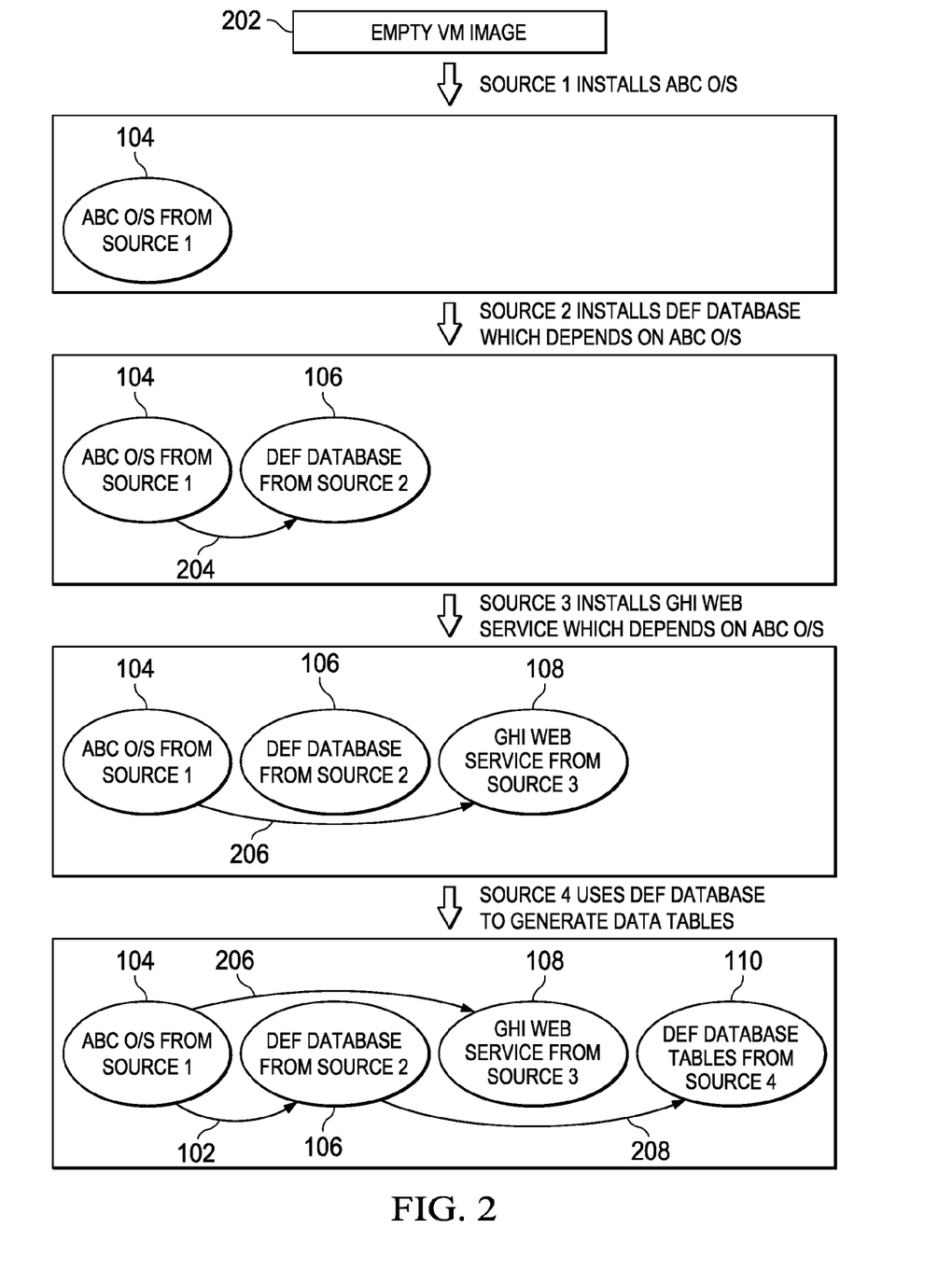
FIG. 2 is a schematic diagram depicting assembly of a VM image in accordance with an embodiment of the invention.

Referring to FIG. 2, there is shown a process of constructing or assembling a VM image, beginning with an empty VM image 202. The VM image to be assembled includes the components 104-110, described above in connection with FIG. 1. These components may respectively be decomposed from VM image 102, or may be acquired from other sources. Also, FIG. 2 again shows respective components 104-110 represented as the nodes of a graph, wherein the graph edges comprise dependencies among the components. Thus, edge 204 shows the dependency of database 106 on operating system 104, as described above. Edge 206 shows the dependency of web service 108 on operating system 104, and edge 208 shows the dependency of database tables 110 on database 106.

In assembling the VM image of FIG. 2, pipeline processing can be used, wherein respective components are streamed sequentially, in an essential or necessary order of provisioning. Thus, operating system 104 is installed first. Database 106, which depends on the operating the system 104, can then be installed. The benefit of this arrangement is that these components can be immediately put to work, without waiting for remaining components to be installed or instantiated. Embodiments of FIG. 2 thus avoid certain delays inherent in prior art arrangements, as described above.

Figure 3:
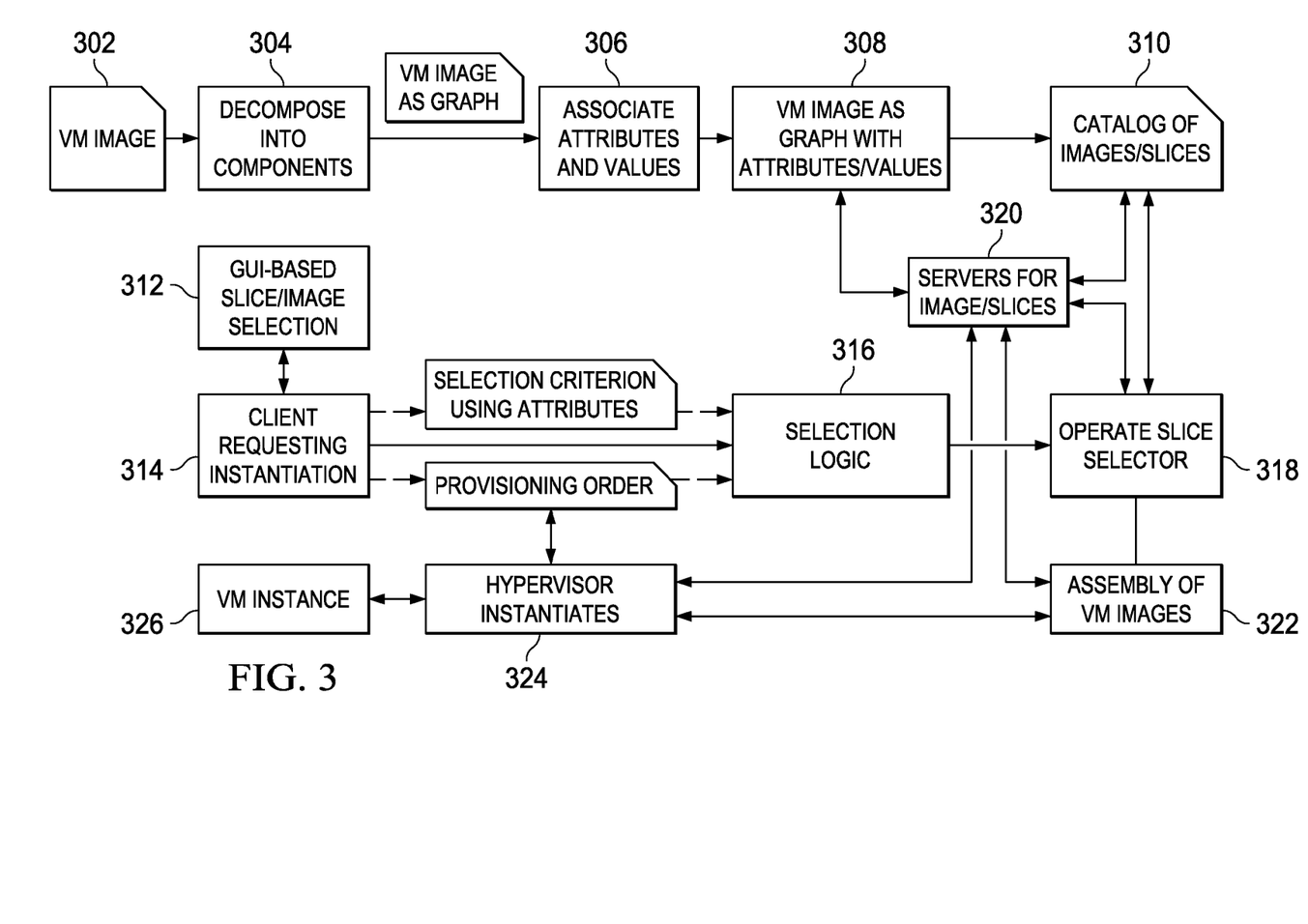
FIG. 3 is a schematic flowchart showing components and steps or tasks included in an embodiment of the invention.

Referring to FIG. 3, there is shown a schematic flowchart showing components and steps or tasks for providing a specified VM instance, or provisioned virtual machine, from an input comprising one or more VM images 302. The VM images 302, for example, may be made available over a network such as the Internet by cloud computing resource providers, although the invention is not limited thereto.

At step 304, a VM image 302 is componentized, or decomposed into one or more components. Usefully, respective components of a VM image are represented as a graph comprising nodes and edges, such as graph 112 of FIG. 1. Each component is associated with or accompanied by certain information, such as component demarcation information, component identification information, and information about relationships between components. Component demarcation information could include the address of the first block of a given component, and the address of the last block of that component. Component identification information could include a component owner, the identity of the owner, the owner's authentication signature, and the component type, component version, component description, software license terms and/or software performance. Component relationship information could include containment relationships between components, software execution reference relationships between components, and data modification relationships between components.

At step 306, components and slices of a decomposed VM image are associated with certain attributes or values. A slice, as used herein, comprises one or more components of a decomposed VM image, which collectively form a subgraph of a graph derived from the VM image. The attributes and values include characteristics of components or slices which are typically important to users, and can include trust level, reliability level, functionality, software performance, licensing cost and reliability. Other exemplary attributes and values could be deployability, whether a password is in plain text for a given component, and whether the key lengths for encryption used by a given component are at least 256 bits.

At step 308, VM images represented as graphs are provided, along with the attributes and values of their respective components and slices. At step 310, all the information provided by these graphical representations is listed in a catalog of images and slices. This catalog can be presented to a cloud user, who can then select slices that are associated with or will provide the attributes desired by that user. The selection could include slices from different VM images. A VM image can then be assembled from the selected slices, as described hereinafter in further detail.

Referring further to FIG. 3, the process of assembling a given VM instance can begin at step 312, wherein a user inputs slice/image selection information by means of a GUI or the like. In response, a client requests a specified instantiation, at step 314. Also, the user furnishes two important specifications, comprising (1) selection criterion using attributes, such as those described above, and (2) provisioning order. The selection criterion could be, for example that reliability must be at a 99% level, and the licensing cost must not exceed $50. An example of provisioning order could be that an ABC operating system is to be installed first, and a DEF database is to be installed second, with both components to be installed in not more than one hour. Other components included in the specified VM image would be installed in a specified order, in not more than 24 hours.

As shown by FIG. 3, the two above specifications furnished by the user are directed to step 316, which uses them to create selection logic. The selection logic could, for example, determine that the provisioning order specified by the user was valid and satisfiable. The selection logic is then used at step 318, to operate a slice selector to query the catalog at step 310. More particularly, the slice selector searches the catalog for image slices that will meet all requirements specified by the user. In its operation, the slice selector may rely on a packing list that identifies components which are necessary to assemble respective components into a specified VM image.

After the slice selector has located the necessary slices in the catalog, it communicates with servers at step 320, to determine which servers have those slices. The slices are then downloaded from the servers, to assemble the specified VM image at step 322. A hypervisor instantiates the VM image at step 324, to provide the given VM instance 326.

Figure 4:
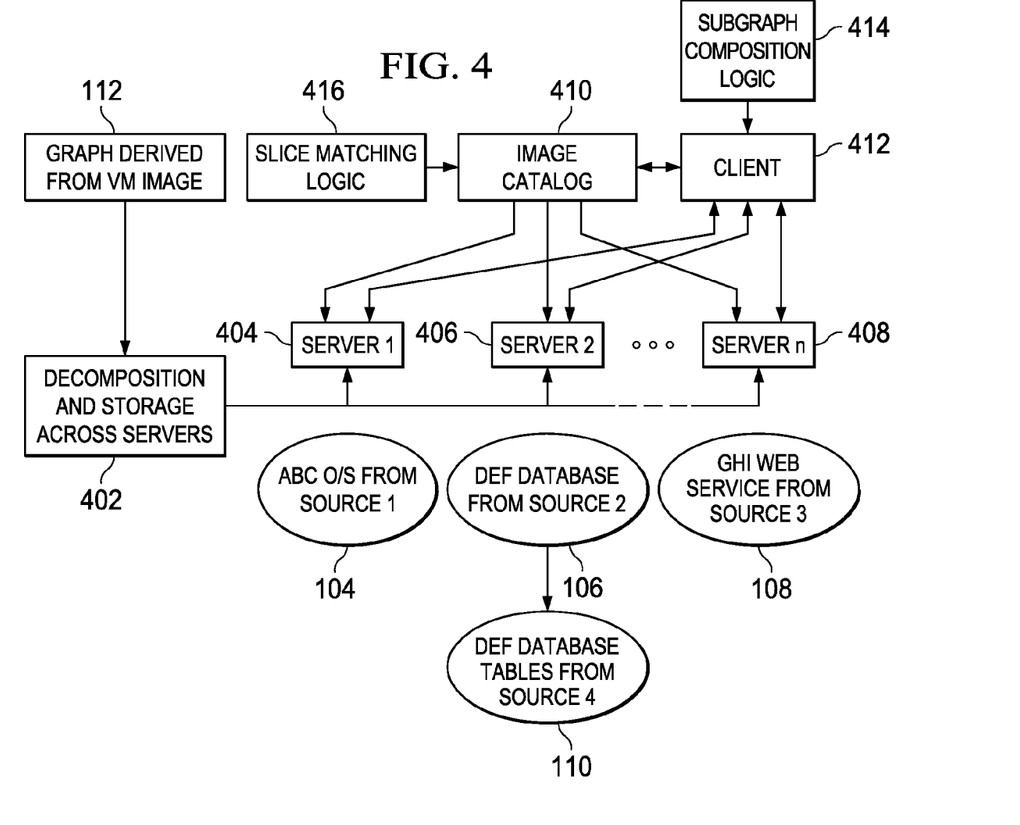
FIG. 4 is a schematic view further showing components of an embodiment of the invention.

Referring to FIG. 4, there is shown a graph derived from a VM image as described above, such as graph 112 of FIG. 1. A means 402 decomposes the graph, and stores its respective components at servers 1-$n$, also referenced as servers 404-408, respectively. Thus, for graph 112, operating system 104 could be stored on server 404, database 106 and database tables 110 comprising subgraph 120 could be stored on server 406, and web service 108 could be stored on server 408.

Referring further to FIG. 4, there is shown an image catalog 410 for storing image and slice information, such as information stored on the servers 404-408 as described above. Information contained in catalog 410 could more particularly include a list of stored images, metadata for the images, and the graph schema for each image. The list could also identify the slices of an image that were deployable and those that were not portable. The list could similarly identify the slices of an image that were trusted and those that were not trusted.

In order to create a specified VM instance, a client 412 can search the catalog for image slices that meet respective requirements set forth by a user, as described above. The search can be assisted by subgraph composition logic 414 and slice matching logic 416.

Referring further to FIG. 4, after finding and selecting the necessary slices from the catalog 410, the client 412 requests instantiation of the specified VM instance. The hypervisor (not shown in FIG. 4) receives all subgraphs representing the selected slices and components from their respective servers, and composes or assembles them to construct a complete VM image. The hypervisor then instantiates the assembled image, to provide the specified VM instance.

Figure 5:
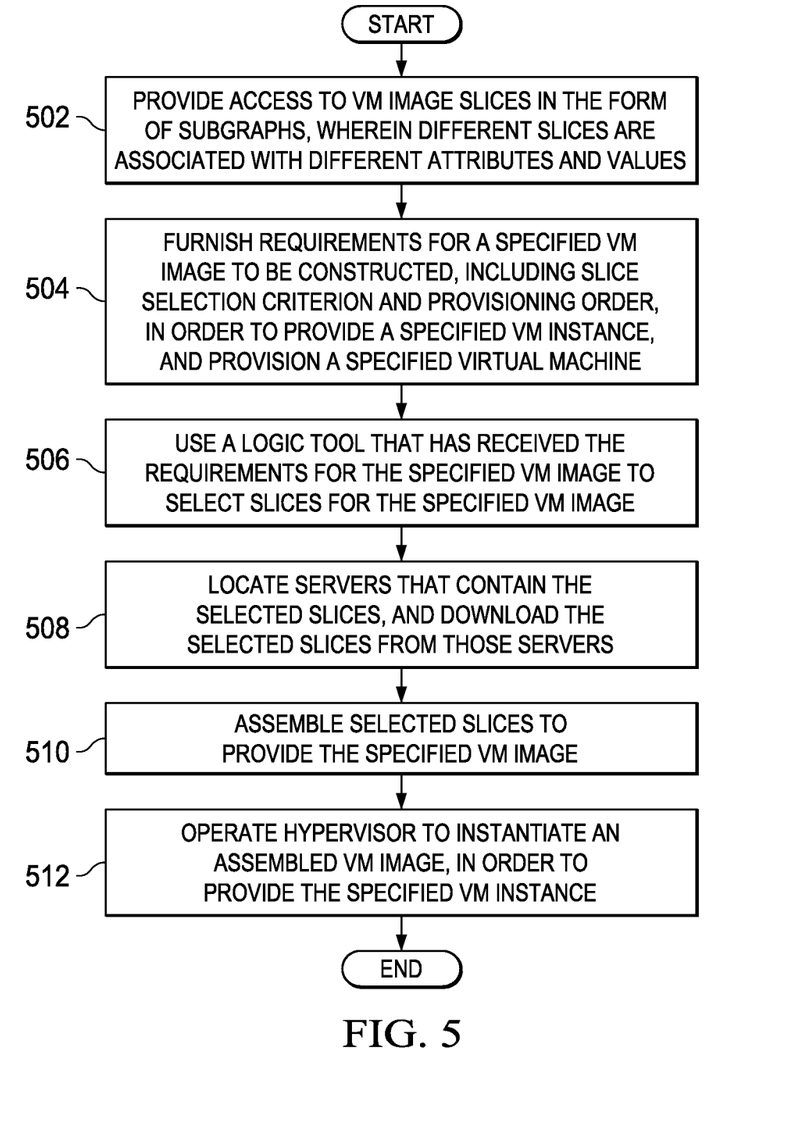
FIG. 5 is a flowchart showing steps for a method comprising an embodiment of the invention.

Referring to FIG. 5, there are shown steps for a method comprising an embodiment of the invention. At step 502, a user is provided with access to VM image slices in the form of subgraphs, as described above, wherein different slices are associated with different attributes and values. In one embodiment, the user could access and use a catalog of images and slices, such as described in connection with FIG. 3 and FIG. 4. In another embodiment, the user could himself decompose one or more VM images, to obtain the needed image slices.

At step 504, the user furnishes requirements for a specified VM image to be constructed, including slice selection criterion and provisioning order, in order to provide a specified VM instance. At step 506, a logic tool that has received the requirements for the specified VM image is used to select slices for the specified VM image. The logic tool could, for example, include the slice selector used at step 318 of FIG. 3. The logic tool could also generate a packing list that identified each slice needed to assemble the specified VM image.

Referring further to FIG. 5, at step 508 the servers that contain the selected slices are located, and the selected slices are respectively downloaded therefrom. At step 510 the selected slices are assembled to provide the specified VM image. A hypervisor is then operated at step 512, to instantiate the assembled VM image, in order to provide the specified VM instance.

Figure 6:
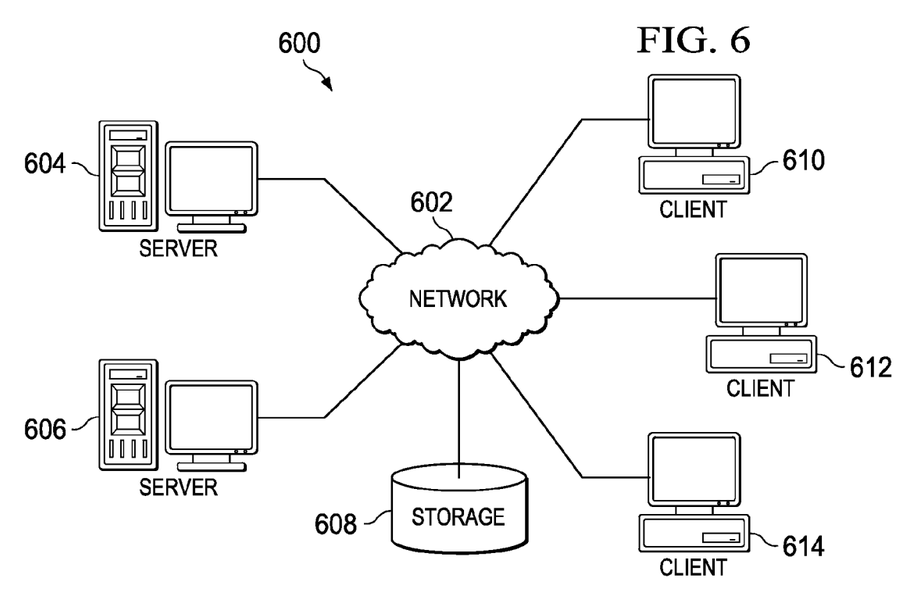
FIG. 6 is a block diagram showing a network of data processing systems in which an embodiment of the invention may be implemented.

FIG. 6 is a pictorial representation of a network of data processing systems in which illustrative embodiments of the invention may be implemented. Network data processing system 600 is a network of computers in which the illustrative embodiments may be implemented. Network data processing system 600 contains network 602, which is the medium used to provide communications links between various devices and computers connected together within network data processing system 600. Network 602 may include connections, such as wire, wireless communication links, or fiber optic cables.

In the depicted example, server computer 604 and server computer 606 connect to network 602 along with storage unit 608. In addition, client computers 610, 612, and 614 connect to network 602. Client computers 610, 612, and 614 may be, for example, personal computers or network computers. In the depicted example, server computer 604 provides information, such as boot files, operating system images, and applications to client computers 610, 612, and 614. Client computers 610, 612, and 614 are clients to server computer 604 in this example. Network data processing system 600 may include additional server computers, client computers, and other devices not shown.

Program code located in network data processing system 600 may be stored on a computer-recordable storage medium and downloaded to a data processing system or other device for use. For example, program code may be stored on a computer-recordable storage medium on server computer 604 and downloaded to client computer 610 over network 602 for use on client computer 610.

In the depicted example, network data processing system 600 is the Internet with network 602 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 600 also may be implemented as a number of different types of networks, such as, for example, an intranet, a local area network (LAN), or a wide area network (WAN). FIG. 6 is intended as an example, and not as an architectural limitation for the different illustrative embodiments.

Figure 7:
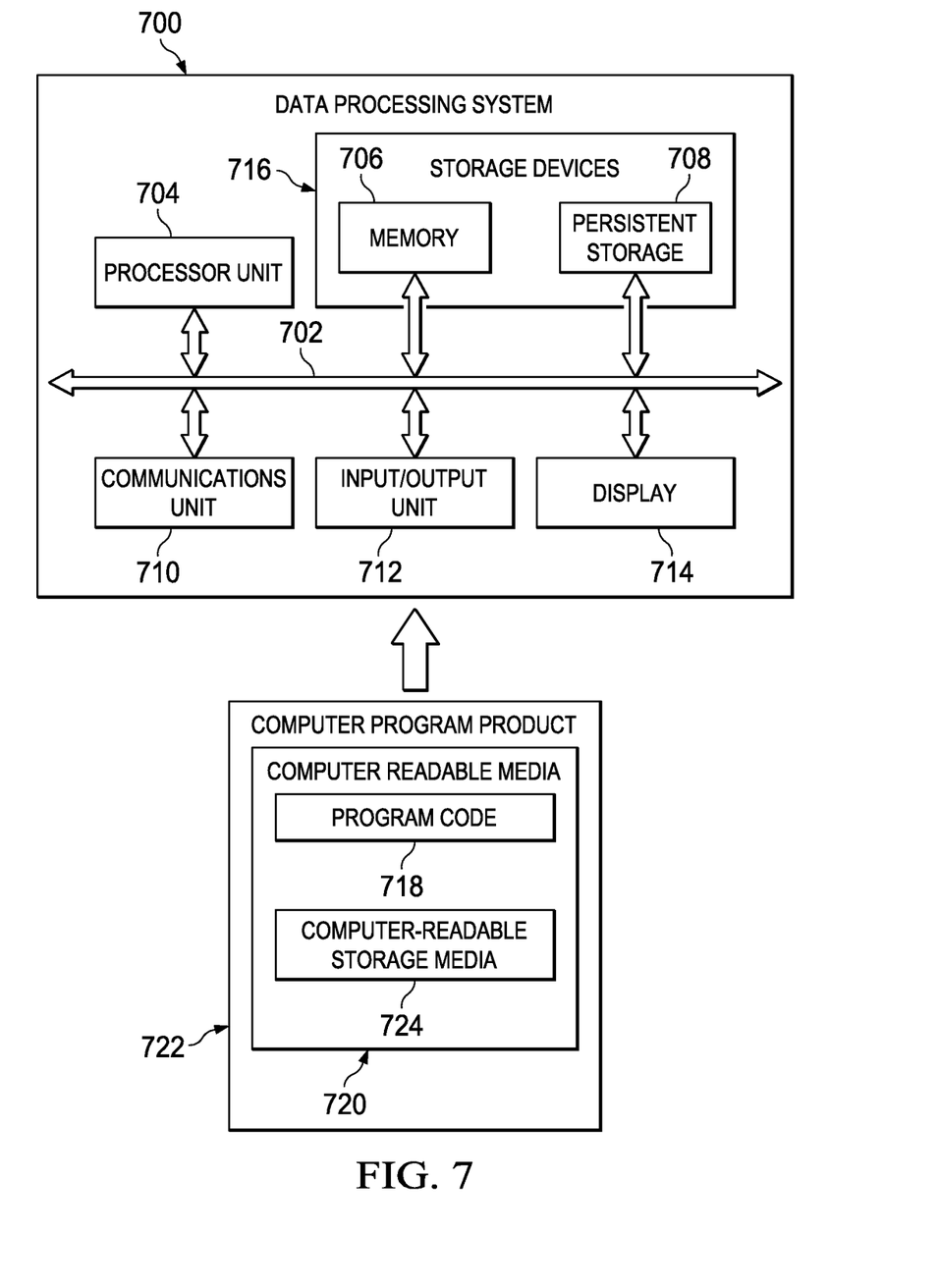
FIG. 7 is a block diagram showing a computer or data processing system that may be used in implementing embodiments of the invention.

Turning now to FIG. 7, an illustration of a data processing system is depicted in accordance with an illustrative embodiment. The data processing system may be used as one or more of the components for network system 600. In this illustrative example, data processing system 700 includes communications fabric 702, which provides communications between processor unit 704, memory 706, persistent storage 708, communications unit 710, input/output (I/O) unit 712, and display 714.

Processor unit 704 serves to execute instructions for software that may be loaded into memory 706. Processor unit 704 may be a number of processors, a multi-processor core, or some other type of processor, depending on the particular implementation. A number, as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer-readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for execution by processor unit 704. The processes of the different embodiments may be performed by processor unit 704 using computer implemented instructions, which may be located in a memory, such as memory 706.

These instructions are referred to as program code, computer-usable program code, or computer-readable program code that may be read and executed by a processor in processor unit 704. The program code in the different embodiments may be embodied on different physical or computer-readable storage media, such as memory 706 or persistent storage 708.

Program code 718 is located in a functional form on computer-readable media 720 that is selectively removable and may be loaded onto or transferred to data processing system 700 for execution by processor unit 704. Program code 718 and computer-readable media 720 form computer program product 722 in these examples. In one example, computer-readable media 720 may be computer-readable storage media 724. Computer-readable storage media 724 may include, for example, an optical or magnetic disk that is inserted or placed into a drive or other device that is part of persistent storage 708 for transfer onto a storage device, such as a hard drive, that is part of persistent storage 708. Computer-readable storage media 724 also may take the form of a persistent storage, such as a hard drive, a thumb drive, or a flash memory, that is connected to data processing system 700. In some instances, computer-readable storage media 724 may not be removable from data processing system 700.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 718 may be omitted because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

As another example, a storage device in data processing system 700 is any hardware apparatus that may store data. Memory 706, persistent storage 708, and computer-readable media 720 are examples of storage devices in a tangible form.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 706, or a cache, such as found in an interface and memory controller hub that may be present in communications fabric 702.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for provisioning a specified virtual machine (VM) from components represented by nodes of one or more selected VM image graphs, the method comprising:
    decomposing each of the one or more selected VM image graphs to provide a set of subgraphs representing a group of components, each component in the group of components represented by a node and having specified information associated with it, wherein the one or more selected VM image graphs are decomposed to provide the set of subgraphs representing the group of components within a VM image catalog, each subgraph in the set of subgraphs included within the VM image catalog represents one or more of the group of components as nodes and edges between nodes represent respective dependencies, and each subgraph having one or more specified attributes, wherein the one or more specified attributes associated with each subgraph in the set of subgraphs include at least one attribute selected from an attribute group that comprises a component owner, an identity of the component owner, the component owner's authentication signature, a component description, component license terms, and component performance, and wherein servers containing each of the selected subgraphs are identified, and wherein each selected subgraph is downloaded from its respective server via a network;

using one or more selection criteria to select components from the group of components represented by the set of subgraphs within the VM image catalog for assembly into a specified VM image based on the specified information associated with each component, wherein the one or more selection criteria comprise a set of attributes specified by a user used to select subgraphs from the VM image catalog for assembling the specified VM image; and using the selected components assembled in the specified VM image to provision the specified virtual machine at one or more locations.

2. The method of claim 1, wherein:
a logic tool that is furnished with the set of attributes specified by the user, is used to select the subgraphs from the VM image catalog.

3. The method of claim 1, wherein:
respective downloaded slices are assembled into the specified VM image to provision the specified virtual machine.

4. The method of claim 1, wherein:
the set of attributes specified by the user for the selection criteria is selected from a group of attributes that includes at least one of a component trust level and a component licensing cost.

5. The method of claim 1, wherein:
a packing list is generated that identifies each subgraph needed to assemble the specified VM image.

6. The method of claim 1, wherein:
information associated with a component includes the address of the first block of the component, and the address of the last block of that component.

7. The method of claim 1, wherein:
information associated with a component includes identification information.

8. The method of claim 1, wherein:
information associated with a component includes information about relationships with other components.

9. A computer system for provisioning a specified virtual machine (VM) from components represented by nodes of one or more selected VM image graphs, the computer system comprising:
a bus;
a memory connected to the bus, wherein the memory stores program instructions; and
a processor connected to the bus, wherein the processor executes the program instructions to decompose each of the one or more selected VM image graphs to provide a set of subgraphs representing a group of components, each component in the group of components represented by a node and having specified information associated with it, wherein the one or more selected VM image graphs are decomposed to provide the set of subgraphs representing the group of components within a VM image catalog, each subgraph in the set of subgraphs included within the VM image catalog represents one or more of the group of components as nodes and edges between nodes represent respective dependencies, and each subgraph having one or more specified attributes, wherein the one or more specified attributes associated with each subgraph in the set of subgraphs include at least one attribute selected from an attribute group that comprises a component owner, an identity of the component owner, the component owner's authentication signature, a component description, component license terms, and component performance, and wherein servers containing each of the selected subgraphs are identified, and wherein each selected subgraph is downloaded from its respective server via a network; use one or more selection criteria to select components from the group of components represented by the set of subgraphs within the VM image catalog for assembly into a specified VM image based on the specified information associated with each component, wherein the one or more selection criteria comprise a set of attributes specified by a user used to select subgraphs from the VM image catalog for assembling the specified VM image; and use the selected components assembled in the specified VM image to provision the specified virtual machine at one or more locations.

10. The computer system of claim 9, wherein:
a logic tool, which is furnished with the set of attributes specified by the user, is used to select the subgraphs from the VM image catalog.

11. A computer program product for provisioning a specified virtual machine (VM) from components represented by nodes of one or more selected VM image graphs, the computer program product comprising a non-transitory computer readable storage medium having program instructions stored thereon, the program instructions executable by a processor to cause the processor to:
decompose each of the one or more selected VM image graphs to provide a set of subgraphs representing a group of components, each component in the group of components represented by a node and having specified information associated with it, wherein the one or more selected VM image graphs are decomposed to provide the set of subgraphs representing the group of components within a VM image catalog, each subgraph in the set of subgraphs included within the VM image catalog represents one or more of the group of components as nodes and edges between nodes represent respective dependencies, and each subgraph having one or more specified attributes, wherein the one or more specified attributes associated with each subgraph in the set of subgraphs include at least one attribute selected from an attribute group that comprises a component owner, an identity of the component owner, the component owner's authentication signature, a component description, component license terms, and component performance, and wherein servers containing each of the selected subgraphs are identified, and wherein each selected subgraph is downloaded from its respective server via a network;

use one or more selection criteria to select components from the group of components represented by the set of subgraphs within the VM image catalog for assembly into a specified VM image based on the specified information associated with each component, wherein the one or more selection criteria comprise a set of attributes specified by a user used to select subgraphs from the VM image catalog for assembling the specified VM image; and use the selected components assembled in the specified VM image to provision the specified virtual machine at one or more locations.

12. The computer program product of claim 11, wherein:
a logic tool, which is furnished with the set of attributes specified by the user, is used to select the subgraphs from the VM image catalog.

13. The computer program product of Claim 11, wherein:
respective downloaded subgraphs are assembled into the specified VM image to provision the specified virtual machine.

* * * * *